United States Patent
Niitsuma (10) Patent No.: US 7,148,984 B2
(45) Date of Patent: Dec. 12, 2006

(54) IMAGE FORMING APPARATUS IN USE WITH A NETWORK

(75) Inventor: Tetsuya Niitsuma, Tokyo (JP)

(73) Assignee: Konica Corporation, Tokyo (JP)

( * ) Notice: Subject to any disclaimer, the term of this patent is extended or adjusted under 35 U.S.C. 154(b) by 1045 days.

(21) Appl. No.: 10/071,986

(22) Filed: Feb. 7, 2002

(65) Prior Publication Data

US 2002/0109860 A1    Aug. 15, 2002

(30) Foreign Application Priority Data

Feb. 15, 2001  (JP)  ............... 2001-038784

(51) Int. Cl.
*G06F 3/12* (2006.01)
(52) U.S. Cl. ............... 358/1.15; 358/1.14; 358/1.13; 358/1.16; 358/1.17; 358/296; 347/129
(58) Field of Classification Search ............... 358/1.13, 358/1.14, 1.15, 1.16, 1.17, 296; 347/129
See application file for complete search history.

(56) References Cited

U.S. PATENT DOCUMENTS 6,065,036 A * 5/2000 Hisatake ............... 718/100
6,130,757 A * 10/2000 Yoshida et al. ............ 358/1.15
6,281,979 B1 * 8/2001 Atobe et al. ............... 358/1.11

FOREIGN PATENT DOCUMENTS

JP   2001-333237 A   11/2001

* cited by examiner

*Primary Examiner*—Joseph R. Pokrzywa
*Assistant Examiner*—Vu B. Hang
(74) *Attorney, Agent, or Firm*—Frishauf, Holtz, Goodman & Chick, P.C.

(57) ABSTRACT

An image forming system, having: a first controller that controls whether to make the first image processor to process image data in accordance with the function selected by the function selector, or to make the written data transmitter to transmit data by transmitting image data to the second image processor with the read data transmitter and by processing image data with the second image processor; a job register that registers plural jobs; a priority order determiner that determines the priority order for output of jobs registered by the job register, and a second controller that determines the outputting order for image data of each job based on the priority order and outputs image data of the job whose priority order is highest among jobs which are capable of immediate output when image data of a job is impossible to be outputted because of a process by the second image processor.

1 Claim, 6 Drawing Sheets

20 JOB LIST

| JOB NAMES | STATUS |
|---|---|
| JOB 1 | IN PROCESS OF OUTPUTTING |
| JOB 2 | IN PROCESS OF EXTERNAL PROCESSING |
| JOB 3 | WAITING FOR EXTERNAL PROCESSING |
| JOB 4 | WAITING FOR OUTPUTTING |
| JOB 5 | WAITING FOR OUTPUTTING |

IMAGE FORMING APPARATUS IN USE WITH A NETWORK

BACKGROUND OF THE INVENTION

The present invention relates to an image forming system.

There has so far been known an image forming apparatus such as a digital copying machine provided with an image reading means that reads an image from a document on which an image is recorded and outputs as image data and with an image forming means that forms an image on a recording sheet based on image data coming from the image reading means.

In the image forming apparatus of this kind, simple image processing such as trimming can be conducted on image data obtained through reading by the image reading means, and the image forming means can form an image based on image data on which the image processing has been conducted.

Further, an image forming system to be used under an environmental condition of a network has been provided.

With regard to the image forming system, it is constituted when an image forming apparatus such as a digital copying machine and an information processing apparatus such as a personal computer and a work station which instruct scanning (reading) of an image and printing for the image forming apparatus, for example, are connected mutually by a network. It is further possible to employ the structure wherein a plurality of image forming apparatuses and a plurality of information processing apparatuses are connected to the network.

In the image forming system of this kind, there has been known a way to utilize as a scanner mode wherein image reading is instructed from the image processing apparatus to the image forming apparatus, and the image obtained by the image forming apparatus through reading is transmitted to the image processing apparatus.

In the conventional image forming system, image data of the image obtained by the image forming apparatus through reading in the scanner mode, for example, is transmitted to an information processing apparatus, and in the information processing apparatus which has received the image data, an image file is stored in a hard disc as it is, or the image file is transmitted to the image forming apparatus as occasion demands, thus, image forming can be conducted.

Under the situations stated above, the inventors of the invention have applied for a patent under TOKKAI No. 200-1333237 for the image forming system wherein an image processing means is provided outside an image forming apparatus, then, image processing is conducted by the external image processing means on image data obtained by the image forming apparatus through reading, and an image is formed on a recording sheet by the image forming apparatus.

As the latest image forming apparatus, there is known a multi-job copying machine wherein a plurality of jobs are accepted in advance, and they are processed in succession, when a series of operations including reading of an image on a document, conducting desired image processing and forming an image on a recording sheet are called a job.

An advantage of the multi-job copying machine is that an order of conducting plural jobs accepted can be changed freely.

As the multi-job copying machine of this kind, the inventors of the invention have applied for a patent for one wherein the order of priority for determining an order of conducting plural jobs can be set freely by a user.

However, there have been the following problems in an image forming apparatus such as the aforesaid conventional digital copying machine and an image forming system.

Namely, in the conventional multi-job copying machine, there is no consideration about application to an image forming system capable of employing an external image forming apparatus, which is the same as the image forming system that has been applied for a patent as TOKKAI No. 2001-333237. Therefore, when a multi-job copying machine is used as an image forming apparatus of the image forming system capable of employing an external image processing apparatus, effective utilization of resources for conducting jobs is not devised, which is a problem.

To be concrete in explanation, when jobs are conducted in the order based on the priority order determined simply in advance, as in the past, a succeeding job needs to wait without being conducted until a preceding job whose priority order precedes is finished.

In the image forming system capable of employing an external image forming apparatus, however, there sometimes is an occasion, depending on a job, wherein some of resources of a multi-job copying machine, such as, for example, a printer section is not used to be out of operation, during a period of image processing conducted by the external image forming apparatus. Nevertheless, in the conventional image system, another job is not allowed to be conducted until the preceding job has been completed, and the printer section is compelled to be out of operation, resulting in that effective utilization of resources is not devised.

SUMMARY OF THE INVENTION

To attain the object mentioned above, as shown in FIG. 5, an image forming system includes an image reading means 31 that reads images on a document and converts them into image data, a first image processing means 32 that processes image data obtained by the image reading means 31, a read data transmitting means 33 that transmits image data obtained by the image reading means 31 through reading, a second image processing means 34 that processes image data transmitted by the read data transmitting means 33, a written data transmitting means 35 that transmits image data processed by the second image processing means 34, an image outputting means 36 that selects either one of image data processed by the first image processing means 32 or image data transmitted by the written data transmitting means 35 and outputs the selected image data as an image, a function selecting means 37 with which an operator who operates the image reading means 31 selects a desired image processing function, a first control means 38 that controls whether to make the first image processing means 32 to process image data in accordance with the function selected by the function selecting means 37, or to make the written data transmitting means 35 to transmit data by transmitting image data to the second image processing means 34 with the read data transmitting means 33, and by processing image data with the second image processing means 34, a job registering means 39 that registers plural jobs relating to image forming, a priority order determining means 40 that determines the priority order for outputting the jobs registered by the job registering means 39, and a second control means 41 that determines the outputting order for image data of each job for the image outputting means 36 based on the priority order determined by the priority order determining means 40, and outputs image data of the job whose priority order is highest among jobs which can be outputted immediately, when immediate output is impossible because of a process by the second image processing means 34 for the job of highest priority order.

Figure 5:
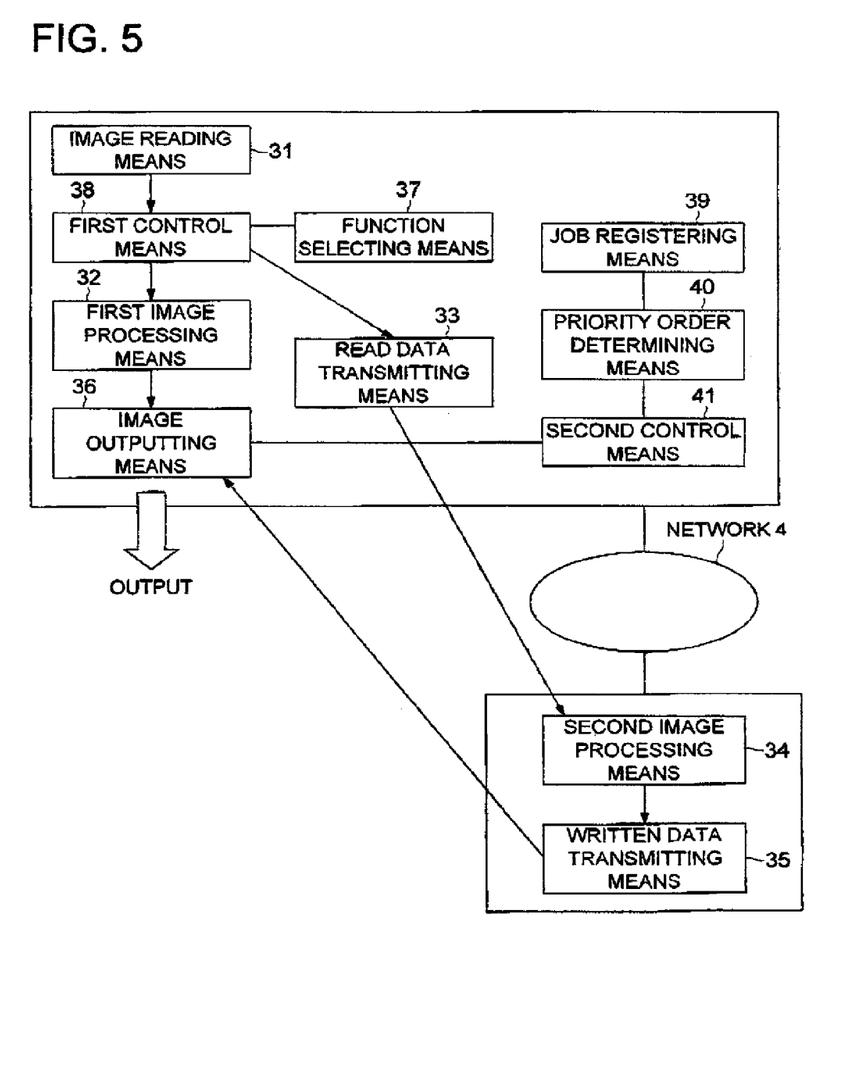
FIG. 5 is a block diagram showing a structure of the image forming system of an embodiment of the present invention.

In addition, the invention is characterized to have a display means that displays a notification that the outputting order has been changed due to the processing conducted by the second image processing means 34.

Figure 6:
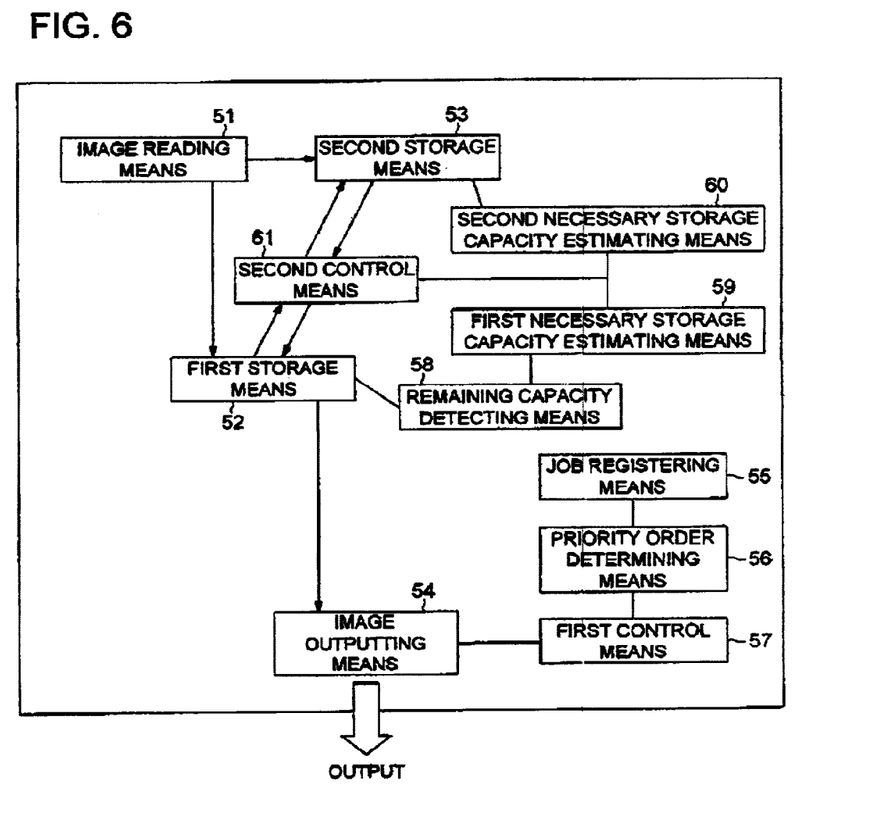
FIG. 6 is a block diagram showing a structure of the image forming system of another embodiment of the present invention.

Further, as shown in FIG. 6, an image forming system according to the present invention includes an image reading means 51 that reads images on a document and converts them into image data, a first storage means 52 that stores image data obtained by the image reading means 51, a second storage means 53 provided separately from the first storage means 52, an image outputting means 54 that outputs image data stored in the first storage means 52 as an image, a job registering means 55 that registers plural jobs relating to image forming, a priority order determining means 56 that determines the priority order for outputting jobs registered by the job registering means 55, a first control means 57 that determines the outputting order for image data of each job for the image outputting means 54 based on the priority order determined by the priority order determining means 56, a remaining capacity detecting means 58 that detects a remaining capacity of the first storage means 52, a first necessary storage capacity estimating means 59 that estimates a storage capacity which is needed for each of an image reading job using the image reading means 51 and an image outputting job using the image outputting means 54, and preserves the estimated storage capacity as the first threshold value, a second necessary storage capacity estimating means 60 that estimates a storage capacity which is needed by the job having the highest priority order among jobs stored in the second storage means 53, and preserves the estimated storage capacity as the second threshold value, and a second control means 61 that transmits image data, of the job having the lowest priority order among jobs registered currently, from the first storage means 52 to the second storage means 53 when the remaining capacity detected by the remaining capacity detecting means 58 becomes the first threshold value or less and that returns image data of the job having the highest priority order among jobs stored in the second storage means 53, from the second storage means 53 to the first storage means 52 when the remaining capacity detected by the remaining capacity detecting means 58 recovers to the second threshold value or more. Each of FIG. 5 and FIG. 6 shows an example of preferred embodiments and, for example, the second storage means 53 and the second necessary storage capacity estimating means 60 shown in FIG. 6 can be provided in a separate apparatus.

DETAILED DESCRIPTION OF THE INVENTION

An embodiment of the invention will be explained as follows, referring to the drawings. Incidentally, in the present embodiment, a digital copying machine of a multi-job type is given as an example of an image forming apparatus, and there will be explained an image forming system constituted by connecting the digital copying machine stated above with an information processing apparatus, namely, with a personal computer representing an example of an image processing server. The image processing server may also be a work station or a large-sized host computer, without being limited to the personal computer.

Figure 1:
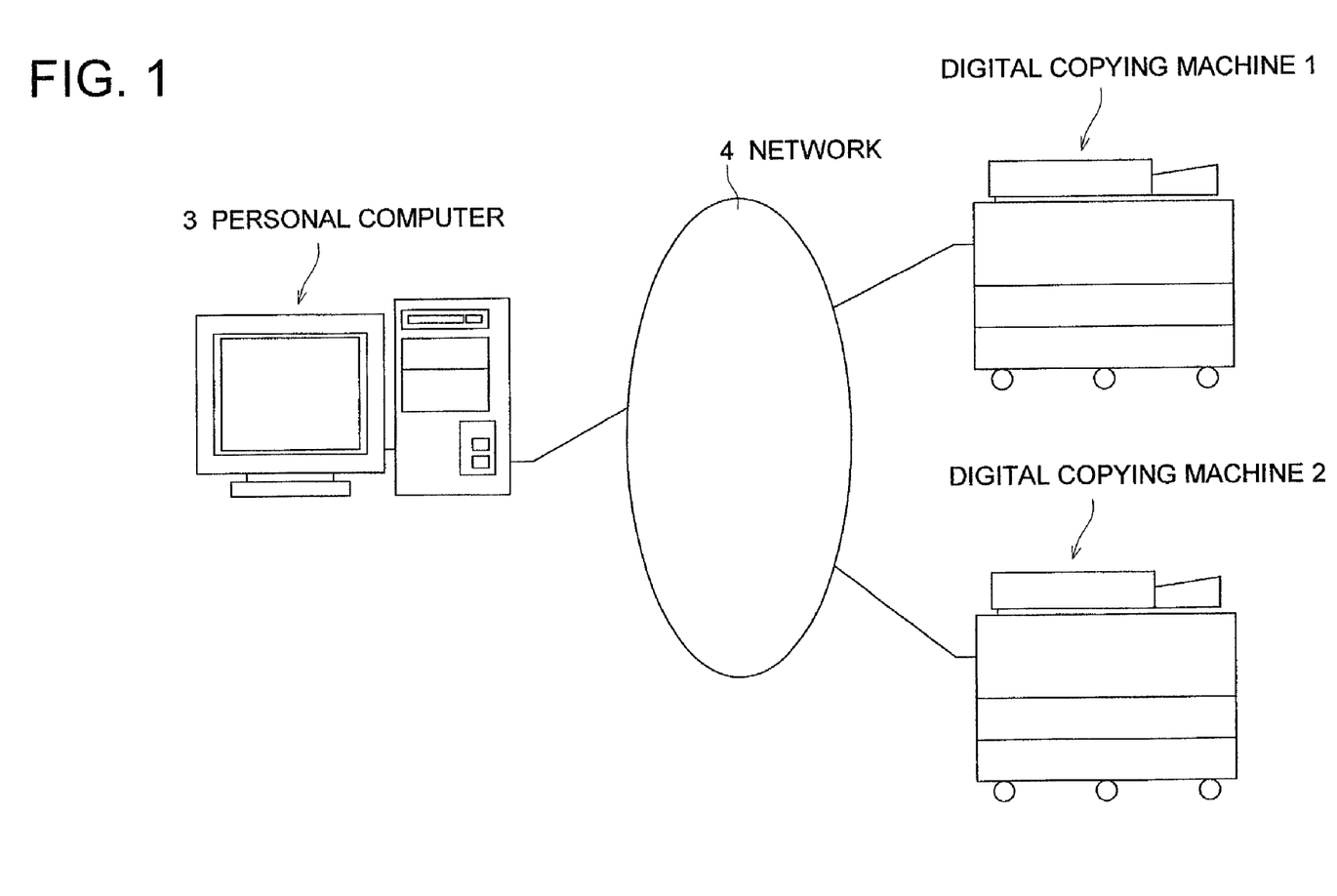
FIG. 1 is a block diagram showing the structure of an embodiment of an image forming system in the invention.

FIG. 1 is a block diagram showing the structure of an embodiment of an image forming system in the invention.

In the present embodiment, two digital copying machines represented by digital copying machine 1 and digital copying machine 2 are provided in the structure. Each of these two digital copying machines 1 and 2 can conduct reading (scanning) of a document and image forming (printing) independently, and it is further possible through connection with network 4 that an image read by digital copying machine 1 is transmitted to digital copying machine 2 so that an image may be formed on the digital copying machine, and the converse is also possible. Namely, images obtained by digital copying machine 1 or digital copying machine 2 through reading can be transmitted to other apparatuses through network 4, or images received from other apparatuses through network 4 can be used on digital copying machine 1 or digital copying machine 2 to form images.

Further, personal computer 3 is also connected to network 4 in the constitution of the present embodiment. It is possible for the personal computer 3 to perform prescribed image processing on image data received from digital copying machines 1 and 2 and to send them back to sources. It is also possible for the personal computer 3 to perform prescribed image processing on image data received from digital copying machine 1, for example, and to send them back to digital copying machine 2 which is different from the source.

In FIG. 1, the network 4 can be of any type including, for example, LAN such as Ethernet and a token ring or the internet. On each of apparatuses connected with the network 4, there is given, in advance, an address on the network, and each apparatus is discriminated by this address, and communicates with other apparatuses connected to the network 4.

Incidentally, in FIG. 1, though the numerical relationship between a personal computer, namely, an image processing server and a digital copying machine, namely, an image forming apparatus is singular number to plural number, this numerical relationship may naturally be plural number to singular number or plural number to plural number.

Figure 2:
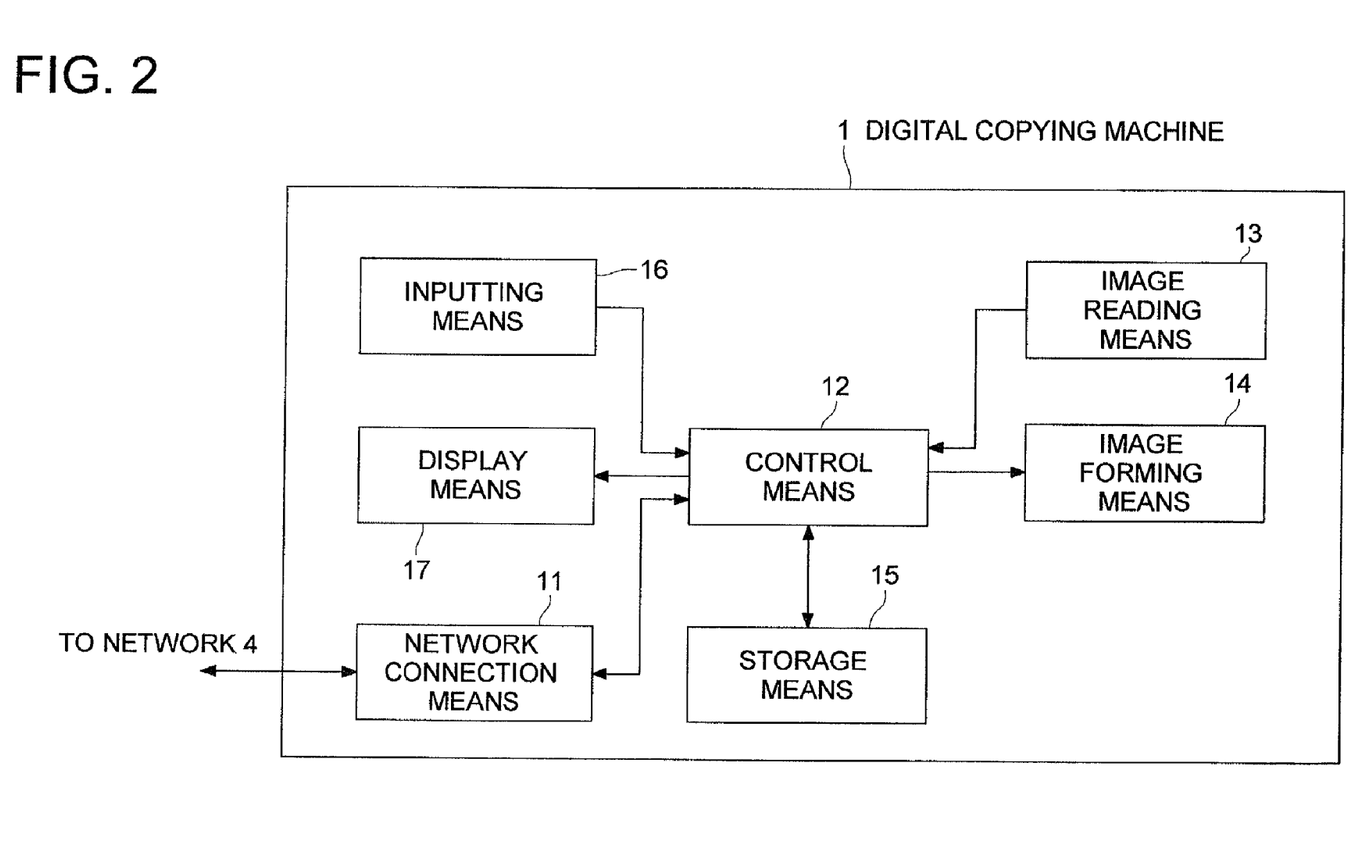
FIG. 2 is a block diagram showing the structure of a digital copying machine shown in FIG. 1.

FIG. 2 is a block diagram showing the structure of digital copying machine 1 shown in FIG. 1.

Since digital copying machine 1 and digital copying machine 2 both shown in FIG. 1 are the same in terms of structure, the digital copying machine 1 will be used for explanation as a representative.

Digital copying machine 1 is constituted to have network connection means 11 representing interface with network 4 shown in FIG. 1, control means 12 that controls operations of the whole of digital copying machine 1, image reading means 13 that reads images from a document, image forming means 14 that forms images on a sheet, for example, storage means 15 that stores image data obtained by the image reading means 13 through reading and parameters necessary for operations of digital copying machine 1, inputting means 16 with which a user inputs operations and instructions for the digital copying machine 1, and display means 17 that displays various pieces of information for the user.

Next, operations of the present embodiment will be explained.

First, when an operator registers a job for digital copying machine, the priority order relating to the order for conducting the job is given to the job.

In the basic principle for the order for conducting jobs, the jobs are conducted in the order of registration. However, it is possible to raise the priority order of the job to expedite the order for conducting, by inputting information to the effect that the job needs to be conducted urgently when an operator, for example, registers the job.

In the digital copying machine 1, jobs registered are conducted in succession in the order based on the priority order of this sort.

Now, an example of procedures for an operator to register a job on digital copying machine 1 will be explained. In this case, there will be explained an occasion wherein the job is to utilize image processing conducted by an external image processing apparatus (for example, personal computer 3).

First, an operator presses an applied function button (not shown) provided on inputting means 16 of digital copying machine 1, at the location where the digital copying machine 1 is installed. The digital copying machine 1 on which the applied function button is pressed communicates with personal computer 3 through network 4 by using an address on the network determined in advance to obtain a list of image processing functions which can be offered by the personal computer 3, and displays this list on display means 17. The operator selects the desired image processing function from the list displayed on the display means 17, and inputs it.

It is preferable that the digital copying machine 1 notifies its address on the network to the personal computer 3 when the digital copying machine 1 inquires of the personal computer 3 about image processing functions which can be offered by the personal computer 3. When the foregoing is carried out, the personal computer 3 can learn the address of a target to which the personal computer 3 transmits the list of image processing functions which it can offer, thereby, the digital copying machine 1 does not need to be registered in advance on the personal computer 3.

As an image processing function capable of being offered by the personal computer 3, there are given, for example, a fair copy making function, an inclination correcting inclination, a dirt removing function and a font converting function, while, all kinds of image processing functions can also be included as a matter of fact.

Incidentally, in this case, when the applied function button is pressed, the digital copying machine 1 communicates with the personal computer 3 to receive from the personal computer 3 the list of image processing functions capable of being offered by the personal computer 3. However, the invention is not limited to the foregoing, and can take another structure wherein a list of image processing functions capable of being offered by other apparatuses is registered and preserved in storage means 15 in advance, and when an applied function button is pressed, the list registered and preserved in the storage means 15 in advance is displayed.

It is further possible to employ the structure wherein a plurality of image processing servers each being like personal computer 3 are connected to network 4, and a list of image processing functions capable of being offered by either one of the plural image processing servers is displayed so that an operator may select.

The structure to select external processing automatically by function selection as stated above realizes simple operations, by concealing information which is not needed by an operator, namely, a distinction between external processing and internal processing.

Though many pieces of information are shown to an operator, it is possible to arrange so that an operator may select either one of plural image processing servers, namely, an operator may select an image processing server itself. Even when an operator selects an image processing server itself, it is also possible to arrange so that digital copying machine 1 may search image processing servers connected to network 4 and display the list thereof to be selected, or to arrange so that a list of image processing servers connected to network 4 may be registered and preserved in storage means 15 in advance, and the list registered and preserved in the storage means 15 in advance may be displayed to be selected.

Further, if digital copying machine 2 can offer an image processing function which is different from that of digital copying machine 1, the digital copying machine 2 can also be an image processing server.

Further, as a method of communication between digital copying machine 1 and an image processing server, it is naturally possible to employ the method such as the so-called electronic mail, ftp protocol or http protocol.

Next, an operator who has selected an image processing function uses digital copying machine 1 to conduct ordinary copy operations. Namely, the operator sets a document on the digital copying machine 1 and presses a copy start button provided on inputting means 16 of the digital copying machine 1.

Then, in the digital copying machine 1, images recorded on a document are read optically by image reading means 13, thus, there are obtained image data which are compressed by a prescribed compression method to be stored in storage means 15. Any method can be used for that compression method.

In the method stated above, the job utilizing image processing conducted by an external image processing apparatus (for example, personal computer 3) is registered.

With respect to the job which does not utilize image processing conducted by an external image processing apparatus, it is registered when an operator uses digital copying machine 1 to conduct ordinary copy operations. Namely, the operator sets a document on digital copying machine 1 and presses a copy start button provided on inputting means 16 of the digital copying machine 1. Through this operation, images recorded on the document are read optically by image reading means 13 in the digital copying machine 1, and there are obtained image data which are compressed by a prescribed compression method to be stored in storage means 15.

The job registered in the aforesaid manner is registered on a job list provided on storage means 15, and jobs are conducted in the digital copying machine 1 in the order based on this job list. Then, the job which has been conducted is eliminated from the job list.

Figure 3:
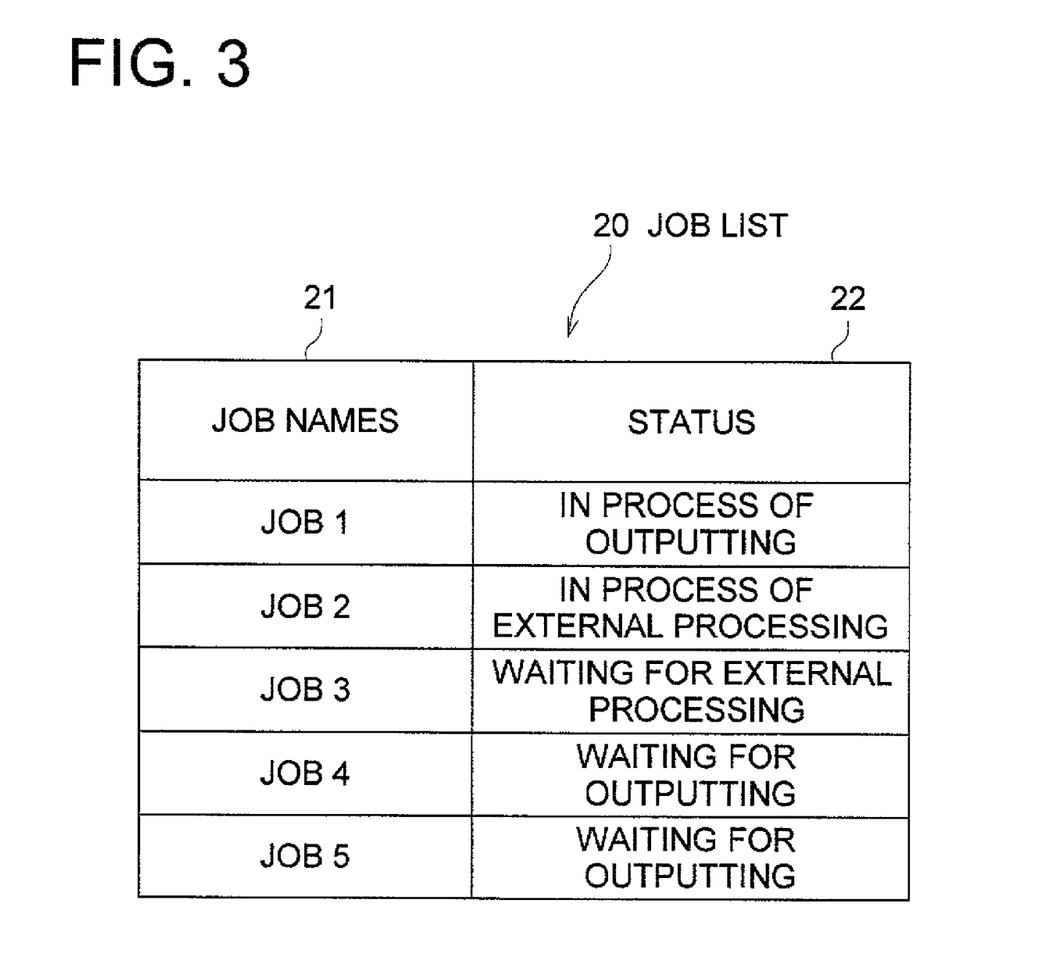
FIG. 3 is a diagram showing an example of a job list provided in a storage means.

FIG. 3 is a diagram showing an example of a job list provided on storage means 15.

On job list 20, the job whose order for conducting is earlier is described to be upper than any other jobs, after the priority order such as a degree of emergency is taken in consideration.

Job name 21 in the case where each job is registered in job list 20 may either be determined by an operator freely to be inputted by inputting means 16, or be determined automatically by digital copying machine 1 to be notified to the operator by display means 17.

Status 22 is a term showing the current status of the job, and it can take four statuses of "waiting for outputting", "waiting for external processing", "in process of external processing" and "in process of outputting".

Figure 4:
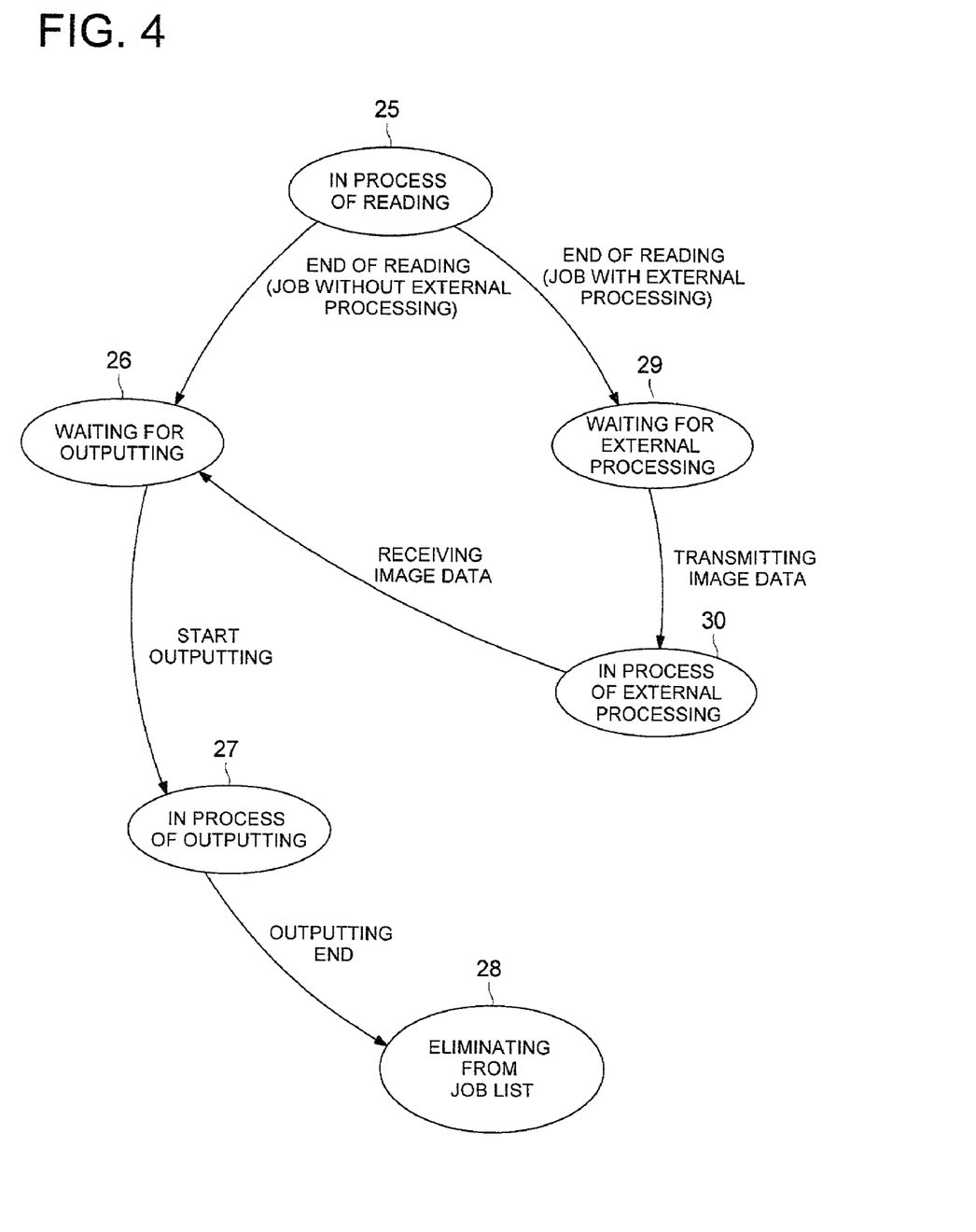
FIG. 4 is a state transition diagram showing the state transition of jobs.

FIG. 4 is a state transition diagram showing the state transition of the job.

When images of the document are being read by image reading means 13, the state of the job is in process of reading 25, and then, the state transits when the reading is completed. After completion of reading, the state transits to waiting for outputting 26 when the job is one that does not conduct external processing.

Under the state of waiting for outputting 26, if the job comes to its turn to be conducted, and outputting is started by image forming means 14, the state of the job transits to in process of outputting 27. After that, if outputting is completed, the job is eliminated from job list 28.

When reading is completed in terms of the state of the job after in process of reading 25, and when the job is one conducting external processing, the state transits to waiting for external processing 29.

Next, when the job is in waiting for external processing 29, if transmission of image data is started from digital copying machine 1 to personal computer 3 in accordance with acceptance of the job by personal computer 3 representing an external image processing apparatus that conducts image processing for image data, the state of the job transits to in process of external processing 30.

After that, when image processing in personal computer 3 is completed, and image data are returned from the personal computer 3 to digital copying machine 1, the state of the job transits to waiting for outputting 26. After this, the job advances in the same way as in the job conducting no external processing, and is subjected to eliminating from job list 28 simultaneously with outputting end, namely with job end.

Now, operations of the occasion where five jobs including job 1–job 5 are registered in job list 20 as shown in FIG. 3 will be explained.

In the example shown in FIG. 3, job 2 and job 3 represent a job that outputs after image processing by an external image forming apparatus is conducted, and job 4 and job 5 represent a job that outputs without image processing by an external image processing apparatus.

Under the state shown in FIG. 3, when outputting of job 1 whose status 22 is "in process of outputting" is completed, image forming means 14 turns out to be free to be ready for output of the succeeding job.

In this case, in the case of the conventional image forming apparatus, outputting of the job whose priority order is next to that of job 1 is to be conducted, because the job whose priority order is next is to be outputted. However, job 2 having the second highest priority order next to that of job 1 is on the in process of external processing, and it is not in the state of capable of outputting. Therefore, even when the image forming means 14 is free and is capable of outputting, it is impossible to output, and the priority is lower than that of job 2, therefore, output of job 4 and job 5 representing the job that is already in the state of capable of outputting cannot be conducted. In the past, since there was no subdivision of "waiting for external processing" and "in process of external processing" as status 22, it was impossible to distinguish these subdivisions from "waiting for outputting", and there has been no way but to wait simply until job 2 turns out to be capable of outputting. In the conventional image forming apparatus, the image forming means 14 cannot operate in spite of presence of the waiting job capable of outputting, as stated above, resulting in a wasteful use of time.

In the present embodiment, therefore, if the output of the job that is in process of outputting currently is completed, output of the job having the highest priority order among jobs having status 22 of "waiting for outputting" already out of waiting jobs is started. Therefore, in the case of an example shown in FIG. 3, when output of job 1 is completed, output of job 4 is started and status 22 of the job 4 turns out to be "in process of outputting".

By doing the foregoing, even when the job such as job 2 or job 3 whose priority order is higher than that of job 4 cannot be outputted immediately due to image processing by an external image forming apparatus, output of job 4 which is already in the state of capable of outputting is conducted. Therefore, it is possible to devise effective utilization of resources without making image forming apparatus 14 to be out of operation.

Incidentally, as a type of status 20, it is also possible to provide the status of "in process of reading" representing the state of reading images on a document with image reading means 13, in addition to the aforesaid statuses.

Further, in the present embodiment, there is realized effective utilization of storage means 15 that is provided on digital copying machine 1 and stores image data of each job. This is a measure about an occasion wherein the number of waiting jobs is increased and a storage capacity of the storage means 15 seems to be insufficient.

Namely, in the present embodiment, necessary image memory amount calculated from the size of a document read by image reading job under the compressibility ratio of 1.0 and an amount of frame memory for output used by outputting job are added together to estimate the memory amount which is needed newly by a reading job and an outputting job, and it is compared with a remaining capacity of the storage means 15. When the estimated memory amount needed is greater, image data of the job whose priority order for execution is lowest among jobs registered currently are transmitted from the storage means 15 to an external image processing apparatus representing, for example, personal computer 3. After that, the remaining capacity of the storage means 15 is restored, and data amount of at least one image of the job having the highest priority order among jobs on personal computer 3 is compared with the remaining amount on the storage means 15 from which the estimated value of memory amount needed newly by reading job and outputting job is subtracted, and when the image data amount is smaller, the image data are returned from the personal computer 3 to the storage means 15. Incidentally, the forwarding address in this case does not always need to be an image processing apparatus having various types of image processing functions, and it may also be a simple storage apparatus.

By doing the foregoing, it is possible to accept image data of new jobs and thereby to accept more jobs than in the past, because the remaining capacity of the storage means 15 can be increased by an amount equivalent to the forwarded image data.

With regard to image data transmitted form storage means 15 to personal computer 3 as stated above, its status is set to "waiting for external processing" or "in process of external processing", and when the remaining capacity of storage means 15 is restored to be the second prescribed value established in advance or more, the image data may be returned to storage means 15 from personal computer 3. Or, if the status of the job is set to "waiting for external shunting" by providing newly the status differing from "waiting for external processing" or "in process of external processing", for example, the status of "waiting for external shunting", it is possible to distinguish from "waiting for external processing" and "in process of external processing" and thereby to show the real state of the job.

The state of the job explained above may either be displayed on display means 17 when an operator inputs the request of job state confirmation from inputting means 16, or be displayed on display means 17 constantly. In this case, with respect to contents to be displayed on the display means 17, job list 20 may be displayed as it is, or it may be processed so that an operator may understand easily. Owing to this, an operator can learn that an order of outputting has been changed because of processing by an external image processing apparatus.

Incidentally, though all of image processes are conducted by external image processing apparatuses in the present embodiment, the invention may also be one wherein prescribed image processing is conducted by control means 12 of digital copying machine 1, without being limited to the foregoing. In this case, with respect to the status of the job in the course of image processing conducted by control means 12, it is possible either to use "in process of reading" or to provide "in process of internal processing" to use it.

Further, the invention cannot be applied to the job utilizing only an image processing function of an external image processing apparatus and to the job utilizing only an image processing function of digital copying machine 1, and it can naturally be applied to the job wherein certain image processing is conducted by digital copying machine 1 on image data, and the image data are transmitted to personal computer 3 to be subjected to image processing, and even for the image data returned from the personal computer 3, some image processing is conducted by digital copying machine 1.

Further, in digital copying machine 1, images on a document are usually read optically by image reading means 13 to obtain luminance data, then, luminance-density conversion processing is conducted in control means 12 to obtain density data of the image, and image forming is conducted by image forming means 14 based on the density data, in which, the image data to be sent from the digital copying machine 1 to the personal computer 3 may either be the luminance data, or the density data, or another type of data.

Further, it may either be one wherein OCR (optical character recognition) function is given to digital copying machine 1, and image data obtained through reading are converted into text data which are sent to personal computer 3 to be subjected to some processing, and are sent back to the digital copying machine 1, or be one wherein OCR (optical character recognition) function is given to personal computer 3, and image data obtained through reading by digital copying machine 1 are sent to personal computer 3 where image data are converted into text data, and then are sent back to digital copying machine 1.

Further, in the same way, as image processing on the personal computer side, it is also possible to apply to the security measure or the physical condition checkup which can be carried out by processing images on regions on a human body such as fingerprint judgment. It is also possible to make a copy having therein a background by composing a background and an original image. It is further possible to output the so-called index wherein several pages are allocated on one page when printing plural copies for plural documents, or to conduct complicated surface processing by changing positional relationship of document images for each document. It is also possible to make an image look more attractive by changing sharpness of image data and to conduct halftone processing. It is further possible to conduct clipping for newspaper articles by hollowing out a part of an image under a certain condition and by making the image to be a different one, and to apply to bank note discrimination, an analysis of handwriting and to marksheet judgment.

In the image forming system of the invention, image compression and image extension are naturally not indispensable.

An image processing function conducted in personal computer 3 namely an external image processing apparatus or in control means 12 of digital copying machine 1 may either be one realized by software processing or be one realized by hardware processing such as an exclusive hardware accelerator.

As explained above, the invention makes it possible to devise effective utilization of resources in the image forming system employing a multi-job accepting image forming apparatus.

Namely, in the invention, productivity can be enhanced by the effective use of an image forming means, because it is possible to conduct outputting of a job whose priority order is lower than that for another job for which an external processing has not been finished.

Further, in the invention, an operator can learn the current state of the registered job, and therefore, the operator can learn why the job of the operator is not outputted and can free the mind from anxiety, even when the job of the operator is not outputted for a long time.

Further, in the invention, image data can be retreated to the outside when the remaining capacity of a storage means provided on an image forming apparatus turns out to be small. Therefore, storage capacity hardly is insufficient, and smooth processing can be carried out.

What is claimed is:

1. An image forming system, comprising:
   image reading means for reading an image on a document and for converting said image into image data;
   first storage means for storing said image data;
   second storage means, provided separately from said first storage means, for storing said image data;
   image outputting means for outputting said image data, stored in said first storage means, as an image;
   job registering means for registering a plurality of jobs, each corresponding to image data, in relation with an image forming process;
   priority order determining means for determining a priority order for outputting said plurality of jobs;
   first control means for determining an outputting order of said image data, corresponding to each of said plurality of jobs, to be outputted from said image outputting means in accordance with said priority order;
   remaining capacity detecting means for detecting a remaining capacity of said first storage means;
   first necessary storage capacity estimating means for estimating a first storage capacity, which is necessary for each of an image reading job with said image reading means and an image outputting job with said image outputting means, so as to preserve said first storage capacity as a first threshold value;
   second necessary storage capacity estimating means for estimating a second storage capacity, which is necessary for a job having a highest priority order among said plurality of jobs stored in said second storage means, so as to preserve said second storage capacity as a second threshold value;

second control means for transmitting image data of a job having a lowest priority order among said plurality of jobs, from said first storage means to said second storage means when said remaining capacity of said first storage means becomes not more than said first threshold value, and for returning image data of the job having the highest priority order among said plurality of jobs stored in said second storage means, from said second storage means to said first storage means when said remaining capacity of said first storage means recovers to not less than said second threshold value.

* * * * *